United States Patent
Kock et al.

(10) Patent No.: US 6,559,614 B2
(45) Date of Patent: May 6, 2003

(54) ELECTRICAL CIRCUIT ARRANGEMENT FOR CONTROLLING AN ELECTROMOTOR IN A MOTOR VEHICLE

(75) Inventors: Cassian Kock, Haltern (DE); Ulrich Hulsmann, Ascheberg (DE); Hartmut Paschen, Dortmund (DE)

(73) Assignee: Leopold Kostal GmbH & Co. KG, Ludenscheid (DE)

(*) Notice: Subject to any disclaimer, the term of this patent is extended or adjusted under 35 U.S.C. 154(b) by 0 days.

(21) Appl. No.: 10/190,929

(22) Filed: Jul. 8, 2002

(65) Prior Publication Data
US 2003/0001534 A1 Jan. 2, 2003

Related U.S. Application Data

(63) Continuation of application No. PCT/EP00/13317, filed on Dec. 21, 2000.

(30) Foreign Application Priority Data

Jan. 8, 2000 (DE) .......................... 100 00 530
Jan. 8, 2000 (DE) .......................... 100 00 531
Jan. 8, 2000 (DE) .......................... 100 00 532

(51) Int. Cl.[7] ................................. H02P 1/04
(52) U.S. Cl. ................ 318/466; 318/280; 318/282; 318/283; 318/286; 318/468; 361/166; 361/167; 361/191; 361/210; 307/9.1; 307/10.1; 307/112; 307/115; 307/116
(58) Field of Search ............... 318/280, 282, 318/283, 286, 445, 466, 468; 361/166, 167, 191, 210; 307/9.1, 10.1, 112, 115, 116

(56) References Cited

U.S. PATENT DOCUMENTS

| | | | | |
|---|---|---|---|---|
| 4,394,605 A | * | 7/1983 | Terazawa ..................... | 318/280 |
| 5,510,684 A | * | 4/1996 | Moroi et al. ................. | 318/282 |
| 6,031,296 A | | 2/2000 | Takagi et al. | |
| 6,060,794 A | | 5/2000 | Takagi et al. | |
| 6,081,085 A | | 6/2000 | Ohashi et al. | |
| 6,111,326 A | * | 8/2000 | Miyata et al. ........... | 307/101.1 |
| 6,246,564 B1 | * | 6/2001 | Sugiura et al. ............. | 361/166 |

* cited by examiner

Primary Examiner—Bentsu Ro
Assistant Examiner—Rina I. Duda
(74) Attorney, Agent, or Firm—Brooks & Kushman, P.C.

(57) ABSTRACT

An electrical circuit arrangement for controlling a unit, such as an adjustment system for windows or a sliding sunroof, that is driven by a motor and is situated in a motor vehicle. The arrangement guarantees that, in the case of a short-circuit of circuit components, especially a control device operation of a motor is still possible, especially in a preferred direction of motor rotation, whereby the direction of rotation results in an opening of the unit and the short-circuit is caused by salt water for instance. Two circuit-breaker elements that operate the motor in either direction can be directly activated by an allocated circuit device which bypasses a failed control device. The remaining circuit-breaker element is blocked at least when the first circuit-breaker element is activated.

12 Claims, 3 Drawing Sheets

ELECTRICAL CIRCUIT ARRANGEMENT FOR CONTROLLING AN ELECTROMOTOR IN A MOTOR VEHICLE

CROSS-REFERENCE TO RELATED APPLICATIONS

This is a continuation of International Application PCT/EP00/13317, published in German, with an international filing date of Dec. 21, 2000.

BACKGROUND OF THE INVENTION

1. Field of the Invention

The invention relates to an electrical circuit arrangement for controlling the position of a movable object present in a motor vehicle and operated by an electric motor. The electric motor can be operated in one or the other of its directions of rotation through two power switching elements controlled by a control device to adjust the position of the movable object. The control device has command inputs from two manual switching devices, one to command the movable object to move in the "opening" direction, and one to command movement in the "closing" direction. When neither manual switching device is activated, the two power switching elements are in turned-off position, and both of the electric motor's terminals are connected, through the associated outputs of the power switching elements, to the same pole (+/−) of a voltage source of a vehicle electrical system.

2. Background Art

Such switching arrangements are provided to control an electrically operated unit present in a motor vehicle, such as a window or sunroof adjustment system, in a manner corresponding to vehicle requirements and legal provisions.

Such an electrical circuit arrangement, for example, is disclosed by DE 31 35 888 C2. The problem with this circuit arrangement is that if the circuit arrangement should have an error occur in it, such as, if there is an electrical short circuit of part of the circuit, then a so-called "emergency opening" is impossible, because the provided components prevent further operation of the electric motor.

This emergency opening is of special significance for motor vehicle window and sunroof adjustment systems operated by electrical motors, e.g. when through carelessness or an accident a motor vehicle ends up in a body of water that is so deep that it is only possible for the passengers to get out through a window or sunroof.

SUMMARY OF THE INVENTION

This invention is based on the task of further developing an electrical circuit arrangement of the type mentioned above in such a way that if a short circuit should occur, for example due to immersion in salt water, it is still possible to operate the electric motor, especially in a preferred direction of rotation, namely the direction of rotation causing the movable object to open.

According to the invention, the task is solved by making it possible for the power switching element assigned to moving the movable object in the "opening" direction to be activated directly when the user activates the manual switch, thereby bypassing the control device. Simultaneously, the power switching element assigned to moving the movable object in the "closing" direction is blocked or prevented at least during the time that the "opening" direction power switching element is activated. Such a design of an electrical circuit arrangement is advantageous in that only a relatively small expense is required to realize such a safety function.

BRIEF DESCRIPTION OF THE DRAWINGS

Further especially favorable embodiments of the invention are described with reference to the following Figures.

DETAILED DESCRIPTION OF THE PREFERRED EMBODIMENT(S)

Figure 1:
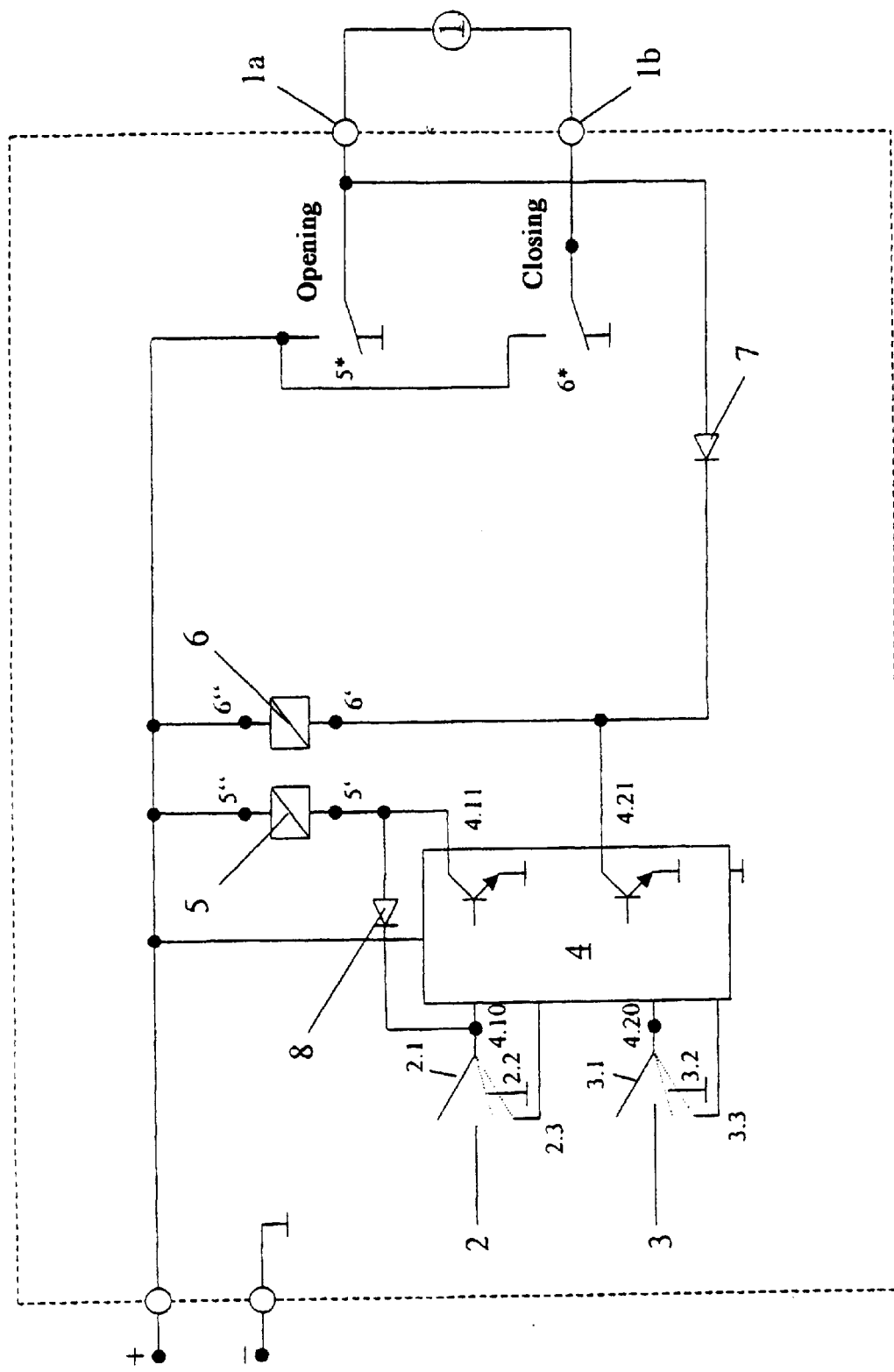
FIG. 1 illustrates a first embodiment of an electrical circuit arrangement in accordance with the invention.

As can be seen from the illustration in FIG. 1, the first embodiment has a control device 4 in the form of a microcomputer that is connected, on its input side, with two manual switching devices 2 and 3. The output side of control device 4 is connected with respective inputs 5' and 6' of two power switching elements 5 and 6. The power switching elements 5 and 6 may be electromechanical relays, for example. The other input 5", 6" of each of power switching elements 5 and 6 are connected with the positive pole (+) of the voltage source of the vehicle electrical system. Each of the power switching element outputs 5*, 6* is connected with one of the terminals 1a and 1b of an electric motor 1. Electric motor 1 is provided to adjust a movable object such as a window or sunroof in a vehicle opening.

When the two power switching elements 5 and 6 are in "open" (also known as "off") position, the terminals 1a, 1b of motor 1 are connected with the grounded negative pole (−) of the voltage source of the vehicle electrical system via power switching element outputs 5*, 6*.

Each of the two switching devices 2 and 3 is assigned to command a direction of rotation of motor 1, and thus to command the associated direction of movement of the movable object in the vehicle opening. Activation of switch 2 causes the movable object to open, and activation of switch 3 causes it to close.

For example, when switch 3 is activated, its moving contact part 3.1 makes contact with the stationary contact part 3.2, causing the associated input 4.20 of control device 4 to be internally connected with the negative pole (−) of the voltage source. Output 4.21 is assigned to input 4.20 and is connected with input 6' of power switching element 6. Thus, when switch 3 is activated, input 6' is also connected through output 4.21 of control device 4 with the negative pole (−) of the voltage source. This applies current to power switching element 6, so that its output 6* switches on and connects terminal 1b of the electric motor 1 to the positive pole (+) of the voltage source. Motor 1 begins to rotate and moves the movable object in the closing direction.

This state of output 4.21 of control device 4, and thus the motor activation, is maintained either as long as switching device 3 is activated, or until the movable object is completely closed, which can be sensed through an automatic function implemented in control device 4. The automatic function is activated, for example, through another stationary contact 3.3 which is also connected with an input of control device 4 and which can make contact when greater force is applied to switching device 3, or through a time evaluation of the duration of activation of switching device 3 that is performed within control device 4.

The process of opening the movable object takes place when switching device 2 is activated, in an analogous manner to the closing process just described.

The functionality described up to now relates to normal operation. In this normal operation, the commands to open or close the window or sunroof can also be sent, e.g., from other remotely arranged switching devices or control devices, which might be connected with the control device 4 through a bus system, instead of from the two manual switching devices 2 and 3.

The circuit in accordance with the invention behaves differently in emergency operation. This emergency operation could be necessary, for example, if an accident causes a vehicle to be immersed in a body of salt water, which generally causes immediate failure of control device 4.

In order for emergency opening of the movable object to be possible now, switching device 2 is directly connected, through a bypass diode 8 that is operated in the conducting direction when switching device 2 is activated, with the input 5' of the power switching element 5. Power switching element 5 is thus energized, switching its output 5* and connected motor terminal 1a from the negative pole (−) to the positive pole (+) of the voltage source. This sets motor 1 rotating in the direction to cause the movable object to open.

Simultaneously, input 6' of power switching element 6 that is assigned to the closing movement is connected, through output 5* and a blocking diode 7, with the positive pole (+) of the voltage source. Since the positive pole (+) of the voltage source is also permanently connected to the other input 6" of power switching element 6, a response of power switching element 6 causing a closing movement is effectively prevented, even if there is an error involving a short circuit of output 4.21 to ground, i.e. to the negative pole (−).

Figure 2:
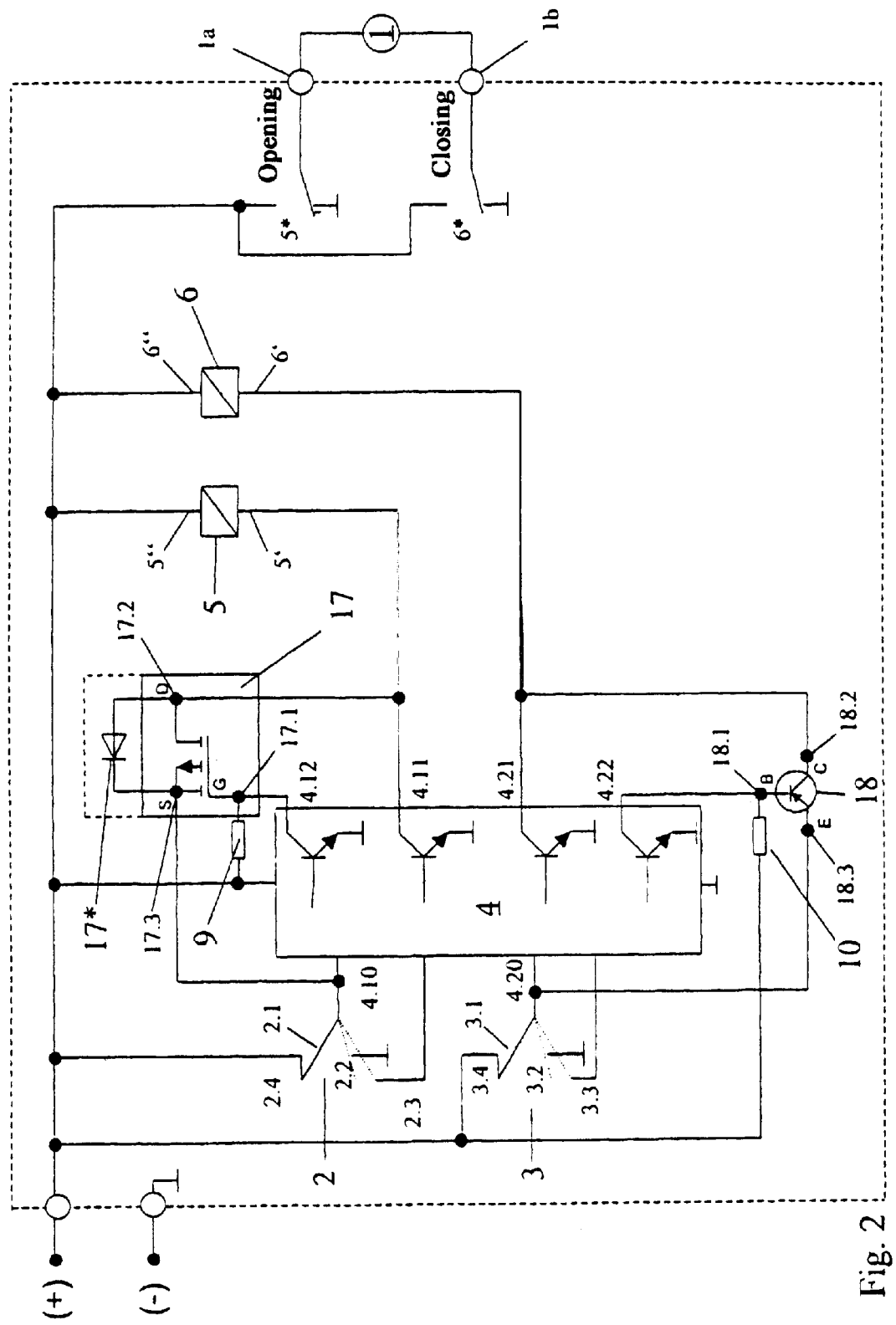
FIG. 2 illustrates a second embodiment of an electrical circuit arrangement using transistors in accordance with the invention.

In the second embodiment shown in FIG. 2, the circuit arrangement also comprises a control device 4 in the form of a microcomputer, whose inputs 4.10 and 4.20 are connected with two manual switching devices 2 and 3. Outputs 4.11 and 4.21 are connected with inputs 5' and 6', respectively, of two power switching elements or relays 5 and 6. Each of the other power switching element inputs 5", 6" is connected with the positive pole (+) of the voltage source of the vehicle electrical system. Power switching element outputs 5*, 6* are connected with terminals 1a and 1b, respectively, of electric motor 1 provided for adjusting the position of the movable object.

Output 4.12 of control device 4 is connected with the gate electrode 17.1 of a field-effect transistor 17. The drain electrode 17.2 of field-effect transistor 17 is connected in turn with the previously mentioned output 4.11, and a source electrode 17.3 is connected with input 4.10 of control device 4. Similarly, output 4.22 of control device 4 is connected with the base electrode 18.1 of a pup transistor 18. The collector electrode 18.2 of pnp transistor 18 is connected in turn with the previously mentioned output 4.21, and an emitter electrode 18.3 is connected with input 4.20 of control device 4.

Outputs 4.11 and 4.12 of control device 4, which are connected to the field-effect transistor 17, are also connected to the power switching element 5 assigned to the direction of rotation causing the movable object to open. Outputs 4.11 and 4.12 are assigned to control device input 4.10, which is connected to manual switching member 2.

Outputs 4.21 and 4.22 of control device 4, which are connected with the pnp transistor 18, are also connected with the power switching element 6 assigned to the direction of rotation causing the movable object to close. Outputs 4.21 and 4.22 are assigned to control device input 4.20, which is connected to manual switching member 3.

Terminals 1a and 1b of motor 1 are connected to outputs 5* and 6*, respectively, of power switching elements 5 and 6. When power switching elements 5 and 6 are in the "open" (i.e., "off") position, terminals 1a and 1b respectively are connected to the grounded negative pole (−) of the voltage source.

Activating switching device 2 causes the movable object to open, by energizing power switching element 5. When power switching element 5 is energized, output 5* connects terminal 1a of motor 1 to the positive pole (+) of the voltage source, while terminal 1b is still connected to ground. Thus, the motor rotates to drive the movable object in the opening direction.

Similarly, activating switching device 3 causes the movable object to close, by energizing power switching element 6. When power switching element 6 is energized, output 6* connects terminal 1b of the motor 1 to the positive pole (+) of the voltage source, while terminal 1a is still connected to ground. Thus, the motor rotates to drive the movable object in the closing direction.

When the circuit arrangement is in its initial state, i.e. after the voltage supply has been turned on and before one of the switching devices 2 and 3 has been activated, the outputs 4.11 and 4.21 that are connected with power switching elements 5 and 6, respectively, are high-resistance. The outputs 4.12 and 4.22 that are connected with gate electrode 17.1 and base electrode 18.1 of transistors 17 and 18, respectively, are connected, inside the control device, with the negative pole (−) of the voltage source. This switches through the transistors 17 and 18, so that the connections 5' and 6' of power switching elements 5 and 6 are connected, through the transistors 17 and 18, with the positive pole (+) of the voltage source, as are the switching devices 2 and 3 that are connected in series with the transistors.

When the switching device 3 that is assigned to the closing process is activated, its moving contact part 3.1 makes contact with the stationary contact part 3.2, which causes the associated input 4.20 of control device 4 to be connected with the negative pole (−) of the voltage source. This causes output 4.22, assigned to input 4.20, to be switched to high-resistance. As a result, base electrode 18.1 of transistor 18 is switched to high-resistance, blocking transistor 18.

Output 4.21 is also assigned to input 4.20. The activation of switching device 3 causes output 4.21 (which has been high-resistance up to now) to be connected through the control device with the negative pole (−) of the voltage source. As a result, input 6' of the power switching element 6 is connected with the negative pole (−). This applies current to power switching element 6 so that its output 6* switches and connects terminal 1b of the electric motor 1 with the positive pole (+) of the voltage source. The motor begins to rotate and moves the movable object in the closing direction.

This state of outputs 4.21 and 4.22 of control device 4, and thus the motor activation, is maintained either as long as switching device 3 is activated, or until the movable object is completely closed, which can be sensed through an automatic function implemented in control device 4. The automatic function is activated, for example, through another stationary contact 3.3 which is also connected with an input of control device 4 and which can make contact when greater force is applied to switching device 3, or through a time evaluation of the duration of activation of switching device 3 that is performed within control device 4.

The process of opening the movable object takes place when switching device 2 is activated, in an analogous manner to the closing process just described.

The functionality described up to now relates to normal operation. In this normal operation, the commands to open or close the movable object can also be sent, e.g., from other remotely arranged switching devices or control devices, which might be connected with the control device 4 through a bus system, instead of from the two switching devices 2 and 3.

The circuit behaves differently in emergency operation which causes immediate failure of control device 4 such as when the vehicle is submerged in salt water. In this case it must first be ensured that no undesired activation of one of the power switching elements 5 or 6 occurs. This is accomplished by transistors 17 and 18.

When switching device 2 is not activated, source electrode 17.3 of transistor 17 is connected directly with the positive pole (+) of the voltage source, while gate electrode 17.1 is connected with it through resistor 9. This means that in the water, the gate 17.1 electrode lies at a lower potential than the source electrode 17.3.

Similarly, when switching device 3 is not activated, emitter electrode 18.3 is connected directly with the positive pole (+) of the voltage source, while base electrode 18.1 is connected with it through resistor 10. This means that in the water, base electrode 18.1 lies at a lower potential than emitter electrode 18.3.

The voltage drop across resistors 9 and 10 ensures that transistors 17 and 18 continue to be switched through, independent of control device 4. Therefore, inputs 5' and 6' of power switching elements 5 and 6 remain connected with the positive pole (+) of the voltage source, and there is no undesired activation of outputs 5\* and 6\*.

To provide for emergency opening of the movable object, switching device 2 is directly connected, through a bypass diode 17\* that is operated in the conducting direction when switching device 2 is activated, with input 5' of the power switching element 5. Actuation of switching device 2 thus connects input 5' to the negative pole (−) of the voltage source. Since input 5" is directly connected to the positive pole (+) of the voltage source, power switching element 5 is energized and switches its output 5\* from the negative pole (−) to the positive pole (+) of the voltage source. This causes the motor to rotate in the direction of opening the movable object.

In the case presented here, where 17 is a field effect transistor, the bypass diode 17\* is in the form of a so-called substrate diode that is directly integrated into the component. Of course, the same functionality can also be achieved if 17 is a bipolar (pnp) transistor, by parallel connection with a separate diode.

As previously described, input 6" is directly connected with the positive pole (+) of the power switching element 6, and input 6' is connected with the positive pole (+) via pnp transistor 18 and switching device 3, so that a response of power switching element 6 causing a closing movement of the movable object is effectively prevented.

Transistor 18 does not have to be a bipolar transistor. If a field effect transistor is used for 18, however, the integrated substrate diode could cause functional limitations regarding additional devices which might be added, such as a device provided for pinching protection.

Figure 3:
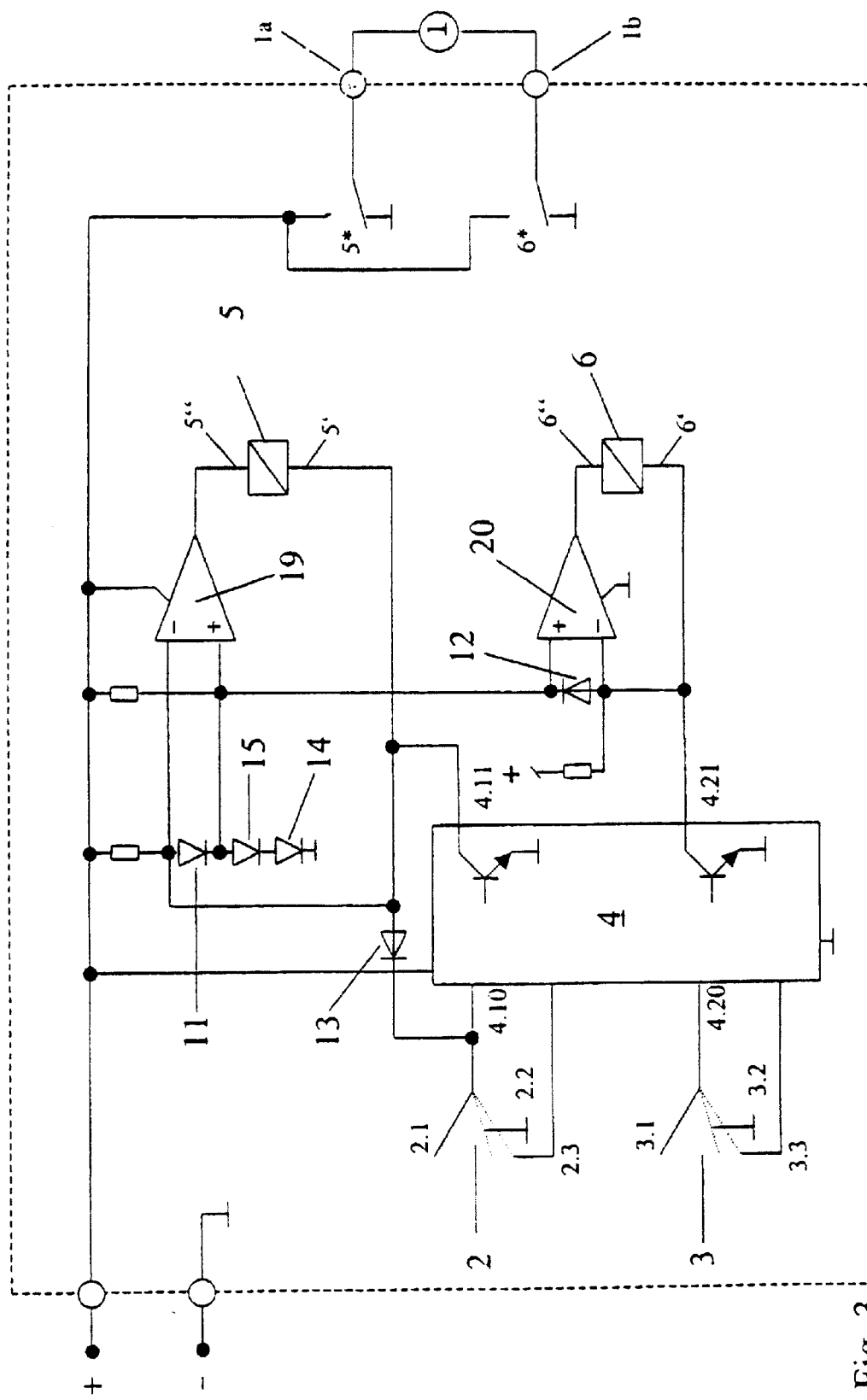
FIG. 3 illustrates a third embodiment of an electrical circuit arrangement using operational amplifiers in accordance with the invention.

As can be seen from FIG. 3, in the third embodiment the circuit arrangement also comprises a control device 4 in the form of a microcomputer. Power switching element 5 is assigned to the direction of rotation causing the movable object to open, and is associated with manual switching member 2. Power switching element 6 is assigned to the direction of rotation causing the movable object to close, and is associated with manual switching member 3.

Input 4.10 of control device 4 is connected to switching device 2. Output 4.11 is assigned to input 4.10. Output 4.11 is connected with input 5' of power switching element 5. Input 5" of power switching element 5 is connected with the output of operational amplifier 19. Output 5\* of power switching element 5 is connected with terminal 1a of the electric motor 1 provided for adjusting the movable object.

Similarly, input 4.20 of control device 4 is connected to switching device 3. Output 4.21 is assigned to input 4.20. Output 4.21 is connected with input 6' of power switching element 6. Input 6" of power switching element 6 is connected with the output of operational amplifier 20. Output 6\* of power switching element 6 is connected with terminal 1b of electric motor 1.

When power switching element 5 is not energized, its output 5\* connects terminal 1a to the grounded negative pole (−) of the voltage source. Similarly, when power switching element 6 is not energized, its output 6\* connects terminal 1b to the grounded negative pole (−).

The non-inverting inputs of operational amplifiers 19 and 20 have a constant potential of 1.4 volts applied to them through the threshold voltages occurring on the series-connected diodes 14 and 15. Diodes 11 and 12 are each connected in series with diodes 14 and 15. When the circuit arrangement is in its initial state, i.e. after the voltage supply has been turned on and before one of the switching devices 2, 3 has been activated, the outputs 4.11 and 4.21 are high-resistance. Thus, the inverting inputs of the operational amplifiers 19 and 20 have a potential of 2.1 volts applied to them by diodes 11 and 12 respectively.

The inputs 5', 6' of power switching elements 5 and 6 are also connected with diodes 11 and 12 respectively, and therefore have a potential of 2.1 volts as well. These input voltages, which are higher than the reference voltage of 1.4 volts applied to the non-inverting inputs of the operational amplifiers 19 and 20, put the operational amplifiers in a switching state in which their outputs are internally connected with the negative pole (−) of the voltage source. The outputs of operational amplifiers 19 and 20 are connected with the inputs 5" and 6" of the power switching elements 5 and 6. Inputs 5" and 6" are therefore also connected to the negative voltage pole (−).

When switching device 3 associated with the closing of the movable object is activated, its moving contact part 3.1 makes contact with the stationary contact part 3.2, which causes the associated input 4.20 of control device 4 to be connected with the negative pole (−) of the voltage source. The result is that the output 4.21 (which has been high-resistance up to now) is connected through control device 4 with the negative pole (−) of the voltage source.

The inverting input of operational amplifier 20, also connected to output 4.21, is likewise connected with the negative pole (−). The inverting input of operational amplifier 20 is now at a lower voltage potential than the non-inverting input, which still has the constant reference potential of 1.4 volts applied to it. As a result, the output of operational amplifier 20 separates from the negative pole of the voltage source and connects to the positive pole.

The output of operational amplifier 20 is connected with the input 6" of the power switching element 6. Input 6" is thus also connected to the positive pole (+) of the voltage source. Since output 4.21 is connected with input 6' of power switching element 6, input 6' is simultaneously connected with the negative pole (−). This applies current to power switching element 6, so that its output 6\* switches and connects terminal 1b of electric motor 1 with the positive pole (+) of the voltage source. Motor 1 begins to rotate and the movable object moves in the closing direction.

This state of output 4.21 of control device 4, and thus the motor activation, is maintained either as long as switching device 3 is activated or until the movable object is completely closed, which can be sensed through an automatic function implemented in control device 4. The automatic function is activated, for example, through another stationary contact 3.3 which is also connected with an input of control device 4 and which can make contact when greater force is applied to switching device 3, or through a time evaluation of the duration of activation of switching device 3 that is performed within control device 4.

The process of opening the movable object takes place when switching device 2 is activated, in an analogous manner to the closing process just described. The functionality described up to now relates to normal operation.

The circuit behaves differently in emergency operation which causes failure of control device 4. In this case it must first be ensured that no undesired activation of one of the power switching elements 5 or 6 occurs. This is accomplished by the fact that the inputs 5', 5", 6', 6" of power switching elements 5 and 6 permanently have potentials connected with them which do not allow them to be activated.

To provide for emergency opening of the movable object, switching device 2 is directly connected, through a bypass diode 13 that is operated in the conducting direction when this switching device is activated, with input 5' of power switching element 5. Switching device 2 is also directly connected with the inverting input of the operational amplifier 19. Activating switching device 2 applies to the inverting input of operational amplifier 19 a potential of 0.7 volts, which is determined by the threshold voltage of the bypass diode 13. The inverting input of operational amplifier 19 is thus lower than the reference voltage of 1.4 volts applied to the non-inverting input, which causes a change in the switching state of operational amplifier 19. Power switching element 5 is energized, and switches its output 5\*, and the motor terminal 1a that is connected with it, from the negative pole (−) to the positive pole (+) of the voltage source. As a result, motor 1 rotates in the direction for opening the movable object.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An electrical circuit arrangement for controlling the position of an object movably driven by a motor having first and second terminals and powered by a voltage source having positive and negative poles, the arrangement comprising:

first and second relays respectively associated with the motor terminals and connected to the positive voltage source pole, the relays switchable between off and on positions, wherein the relays are switched to the on position upon connection to the negative voltage source pole, the relays connecting the respective motor terminals to the negative voltage source pole when the relays are in the off position, the first relay connecting the first motor terminal to the positive voltage source pole when the first relay is in the on position to enable the motor to move the object in an opening direction, the second relay connecting the second motor terminal to the positive voltage source pole when the second relay is in the on position to enable the motor to move the object in a closing direction;

a controller having first and second inputs and first and second outputs, the first and second outputs of the controller respectively connected to the relays;

first and second switches respectively connected to the first and second controller inputs, the switches connected with the negative voltage source pole upon respective actuation, wherein actuation of the first switch causes the first controller output to be connected to the negative voltage source pole thereby switching the first relay to the on position, wherein actuation of the second switch causes the second controller output to be connected to the negative voltage source pole thereby switching the second relay to the on position;

a bypass diode connecting the first relay with the first switch, the bypass diode polarized such that, upon failure of the controller, the first relay is switched to the on position upon actuation of the first switch; and a transistor connecting the second relay with the second switch to maintain the second relay in the off position irrespective of actuation of the second switch upon failure of the controller, wherein the transistor is a pnp transistor having a base electrode connected to a third output of the controller, wherein the pnp transistor connects the third controller output to the negative voltage source pole when the second switch is unactuated.

2. The arrangement of claim 1 wherein:

the relays are electromagnetic relays each having a moving contact part cooperating with two stationary contact parts, with each of the two stationary contact parts being connected to the positive voltage source pole and to the negative pole voltage source pole.

3. The arrangement of claim 1 wherein:

the controller is a micro-processor.

4. The arrangement of claim 1 wherein:

the object is a window.

5. The arrangement of claim 1 wherein:

the object is a sunroof.

6. An electrical circuit arrangement for controlling the position of an object movably driven by a motor having first and second terminals and powered by a voltage source having positive and negative poles, the arrangement comprising:

first and second relays respectively associated with the motor terminals and connected to the positive voltage source pole, the relays switchable between off and on positions, wherein the relays are switched to the on position upon connection to the negative voltage source pole, the relays connecting the respective motor terminals to the negative voltage source pole when the relays are in the off position, the first relay connecting the first motor terminal to the positive voltage source pole when the first relay is in the on position to enable the motor to move the object in an opening direction, the second relay connecting the second motor terminal to the positive voltage source pole when the second relay is in the on position to enable the motor to move the object in a closing direction;

a controller having first and second inputs and first and second outputs, the first and second outputs of the controller respectively connected to the relays;

first and second switches respectively connected to the first and second controller inputs, the switches connected with the negative voltage source pole upon respective actuation, wherein actuation of the first switch causes the first controller output to be connected to the negative voltage source pole thereby switching the first relay to the on position, wherein actuation of the second switch causes the second controller output to be connected to the negative voltage source pole thereby switching the second relay to the on position;

a bypass diode connecting the first relay with the first switch, the bypass diode polarized such that, upon failure of the controller, the first relay is switched to the on position upon actuation of the first switch;

a transistor connecting the second relay with the second switch to maintain the second relay in the off position irrespective of actuation of the second switch upon failure of the controller; and a second transistor arranged in parallel with the bypass diode and connecting the first relay with the first switch, wherein when the first switch is unactuated the second transistor is contacted with the positive voltage source pole.

7. The arrangement of claim 6 wherein:

the second transistor is a field effect transistor having a gate electrode connected to a fourth output of the controller, wherein the field effect transistor connects the fourth controller output with the negative voltage source pole when the first switch is unactuated.

8. The arrangement of claim 7 wherein:

the bypass diode is integrated into the field effect transistor as a substrate diode.

9. The arrangement of claim 6 wherein:

the relays are electromagnetic relays each having a moving contact part cooperating with two stationary contact parts, with each of the two stationary contact parts being connected to the positive voltage source pole and to the negative pole voltage source pole.

10. The arrangement of claim 6 wherein:

the controller is a micro-processor.

11. The arrangement of claim 6 wherein:

the object is a window.

12. The arrangement of claim 6 wherein:

the object is a sunroof.

* * * * *